United States Patent
Ozgur

(10) Patent No.: US 8,465,881 B2
(45) Date of Patent: Jun. 18, 2013

(54) COMPRESSION APPARATUS FOR FUEL CELL STACK

(75) Inventor: Kemal Ozgur, West Vancouver (CA)

(73) Assignee: Daimler AG, Stuttgart (DE)

( * ) Notice: Subject to any disclaimer, the term of this patent is extended or adjusted under 35 U.S.C. 154(b) by 211 days.

(21) Appl. No.: 12/809,460

(22) PCT Filed: Dec. 16, 2008

(86) PCT No.: PCT/US2008/087038
§ 371 (c)(1),
(2), (4) Date: Sep. 15, 2010

(87) PCT Pub. No.: WO2009/085776
PCT Pub. Date: Jul. 9, 2009

(65) Prior Publication Data
US 2011/0003230 A1   Jan. 6, 2011

Related U.S. Application Data

(63) Continuation of application No. 11/961,883, filed on Dec. 20, 2007, now abandoned.

(51) Int. Cl.
*H01M 2/20* (2006.01)

(52) U.S. Cl.
USPC ........... 429/470; 429/452; 429/467; 429/469; 429/471; 429/511

(58) Field of Classification Search
USPC .......... 429/452, 460, 467–471, 511
See application file for complete search history.

(56) References Cited

U.S. PATENT DOCUMENTS

| 3,134,697 | A |   | 5/1964  | Niedrach |
|-----------|---|---|---------|----------|
| 3,297,490 | A |   | 1/1967  | Barber et al. |
| 4,057,479 | A |   | 11/1977 | Campbell |
| 4,214,969 | A |   | 7/1980  | Lawrance |
| 4,478,917 | A |   | 10/1984 | Fujita et al. |
| 5,486,430 | A |   | 1/1996  | Gorbell et al. |
| 5,993,987 | A | * | 11/1999 | Wozniczka et al. ........... 429/470 |
| 6,210,823 | B1 | * | 4/2001 | Hatoh et al. ................ 429/465 |
| 6,653,008 | B1 |   | 11/2003 | Hirakata et al. |
| 2003/0162078 | A1 |   | 8/2003 | Kikuchi et al. |

FOREIGN PATENT DOCUMENTS

| DE | 10 2004 027 694 A1 | 8/2005 |
| JP | 2002-343410 A | 11/2002 |
| JP | 2006-49221 A | 2/2006 |

OTHER PUBLICATIONS

International Search Report dated Apr. 7, 2009 (Ten (10) pages).

* cited by examiner

*Primary Examiner* — Patrick Ryan
*Assistant Examiner* — Ben Lewis
(74) *Attorney, Agent, or Firm* — Crowell & Moring LLP

(57) ABSTRACT

In a fuel cell stack assembly, a mechanism for securing the fuel cell stack in its compressed, assembled state includes a spring bar loading a disc spring at an inner diameter of the disc spring and a compression band which circumscribes the fuel cell stack assembly.

15 Claims, 8 Drawing Sheets

COMPRESSION APPARATUS FOR FUEL CELL STACK

This application is a national stage of PCT International Application No. PCT/US2008/087038, filed Dec. 16, 2008, which is a continuation of U.S. patent application Ser. No. 11/961,883, filed Dec. 20, 2007, now abandoned, the entire disclosures of which are herein expressly incorporated by reference.

BACKGROUND OF THE INVENTION

The present disclosure relates to a fuel cell stack assembly in which the mechanism for securing the fuel cell stack in its compressed, assembled state includes a spring bar loading a disc spring at its inner diameter and a compression band which circumscribes the fuel cell stack assembly.

Fuel cells convert fuel and oxidant to electricity and reaction products. Solid polymer electrochemical fuel cells generally employ a membrane electrode assembly ('MEA') consisting of a polymer electrolyte membrane ('PEM') (or ion exchange membrane) disposed between two electrodes comprising porous, electrically conductive sheet material and an electrocatalyst disposed at each membrane/electrode layer interface to induce the desired electrochemical reaction.

In typical fuel cells, the MEA is disposed between two electrically conductive separator or fluid flow field plates. Fluid flow field plates have at least one flow passage formed therein to direct the fuel and oxidant to the respective electrodes, namely, the anode on the fuel side and the cathode on the oxidant side. In a single cell arrangement, fluid flow field plates are provided on each of the anode and cathode sides. The plates also act as current collectors and provide mechanical support for the electrodes.

Two or more fuel cells can be connected together in series to form a fuel cell stack to increase the overall voltage of the assembly. In a fuel cell stack, one side of a given plate serves as an anode plate for one cell and the other side of the plate can serve as the cathode plate for the adjacent cell.

The fuel cell stack typically further includes manifolds and inlet ports for directing the fuel and the oxidant to the anode and cathode flow field passages respectively. The fuel cell stack also usually includes a manifold and inlet port for directing a coolant fluid, typically water, to interior passages within the fuel cell stack to absorb heat generated by the exothermic reaction in the fuel cells. The fuel cell stack also generally includes exhaust manifolds and outlet ports for expelling the unreacted fuel and oxidant gases, as well as an exhaust manifold and outlet port for the coolant stream exiting the fuel cell stack.

In conventional fuel cell stack assembly designs, such as, for example, those described and illustrated in U.S. Pat. Nos. 3,134,697; 3,297,490; 4,057,479; 4,214,969; and 4,478,917, the plates which make up each conventional fuel cell assembly are compressed and maintained in their assembled states by tie rods. The tie rods extend through holes formed in the peripheral edge portion of the stack end plates and have associated nuts or other fastening means assembling the tie rods to the stack assembly and compressing the end plates of the fuel cell stack assembly toward each other. Typically the tie rods are external, that is, they do not extend through the fuel cell separator or flow field plates. One reason for employing a peripheral edge location for the tie rods in conventional designs is to avoid the introduction of openings in the central, electrochemically active portion of the fuel cells.

The peripheral edge location of the tie rods in conventional fuel cell designs however, has inherent disadvantages. It requires that the thickness of the end plates be substantial in order to transmit the compressive force evenly across the entire area of the plate. Also, the peripheral location of the tie rods can induce deflection of the end plates over time if they are not of sufficient thickness. Inadequate compressive forces can compromise the seals associated with the manifolds and flow fields in the central regions of the interior plates, and also compromise the electrical contact required across the surfaces of the plates and MEAs to provide the serial electrical connection among the fuel cells which make up the stack. End plates of substantial thickness however, contribute significantly to the overall weight and volume of the fuel cell stack, which is particularly undesirable in motive fuel cell applications. Also, when external tie rods are employed, each of the end plates must be greater in area than the stacked fuel cell assemblies. The amount by which the end plates protrude beyond the fuel cell assemblies depends on the thickness of the tie rods, and more importantly on the diameter of the washers, nuts and any springs threaded on the ends of tie rods, since preferably these components should not overhang the edges of end plate. Thus the use of external tie rods can increase stack volume significantly.

A compact fuel cell stack design incorporating internal tie rods which extend between the end plates through openings in the fuel cell plates and membrane electrode assemblies has been disclosed in U.S. Pat. No. 5,484,666. However, such designs increase the number of required seals in the MEA, increasing complexity, manufacturing costs and potential failure mechanisms.

Various designs in which one or more rigid compression bars extend across each end plate, the bars being connected (typically via external tie rods and fasteners) to corresponding bars at the opposite end plate, have been employed in an effort to reduce the end plate thickness and weight, and to distribute compressive forces more evenly. Such a design is described and illustrated in U.S. Pat. No. 5,486,430.

The fuel cell stack compression mechanisms described above typically utilize springs, hydraulic or pneumatic pistons, pressure pads or other resilient compressive means which cooperate with the tie rods, which are generally substantially rigid, and end plates to urge the two end plates towards each other to compress the fuel cell stack. These compression mechanisms undesirably add weight and/or volume and complexity to the fuel cell stack.

Tie rods typically add significantly to the weight of the stack and are difficult to accommodate without increasing the stack volume. The associated fasteners add to the number of different parts required to assemble a fuel cell stack.

U.S. Pat. No. 5,993,987 discloses a fuel cell stack including end plate assemblies with compression bands extending tightly around the end plate assemblies which retain and secure the fuel cell stack in its assembled state. The end plate assembly further comprises a pair of layered plates with stacks of disc springs interposed between them. The end plate assemblies preferably have rounded edges to reduce the stress on the band.

Disc springs are conventionally contacted over their inner diameter under load. For example, National Disc Springs catalogue and manual of the Rolex Company National Disc Spring Division of 385 Hillside Avenue, Hillside N.J. teaches that such disc springs should contact the load imposing surface with the disc spring's outer diameter. However, loading the disc spring by the outer diameter requires a greater amount of material to load the outer diameter resulting in greater weight and volume, increased cost of material, and reduced power density and efficiency, especially in automotive applications.

It is desirable to have a fuel cell stack with reduced weight and volume resulting in increased power density, efficiency and reduced cost. The present disclosure addresses these and associated benefits.

BRIEF SUMMARY OF THE INVENTION

In one embodiment, a fuel cell stack assembly comprises a first end plate; a second end plate; a plurality of fuel cells interposed between the first and second end plates; a spring bar; a disc spring having an inner and outer diameter, interposed between the first end plate and the spring bar, wherein the spring bar loads the disc spring at the disc spring's inner diameter; and a compression band circumscribing the first endplate, the second end plate, the plurality of fuel cells and the spring bar, the compression band urging the spring bar toward the first end plate and second end plate, thereby applying compressive force upon the plurality of fuel cells.

In another embodiment, a fuel cell stack assembly comprises a first end plate; a second end plate; a plurality of fuel cells interposed between the first and second end plates, a first spring bar; a second spring bar; a first disc spring having an inner and outer diameter, interposed between the first end plate and the first spring bar, wherein the first spring bar loads the first disc spring at the first spring bar's inner diameter; a second disc spring having an inner and outer diameter, interposed between the second end plate and the second spring bar. The second spring bar loads the second disc spring at the second spring bar's inner diameter; and a compression band circumscribes the first spring bar, the second spring bar, the plurality of fuel cells, the first end plate and the second end plate. The compression band urges the first spring bar toward the second spring bar, thereby applying compressive force upon the plurality of fuel cells.

In yet another embodiment, the fuel cell stack assembly according to the invention comprises a first end plate; a second end plate; a plurality of fuel cells interposed between the first and second end plates; a spring bar; a disc spring having an inner and outer diameter, interposed between the first end plate and the spring bar. The spring bar loads the disc spring at the disc spring's inner diameter; and a compression member urges the spring bar toward the first end plate and second end plate, thereby applying compressive force upon the plurality of fuel cells.

The width of the spring bar may be less than the outer diameter of the disc spring and may be comprised of a resilient material such as aluminum, steel, plastic, and composite fiber based material. The spring bar may be adapted to engage the disc spring at the disc spring's inner diameter and may be adapted to receive the compression band.

The end plate may be adapted to receive a disc spring.

Other objects, advantages and novel features of the present invention will become apparent from the following detailed description of the invention when considered in conjunction with the accompanying drawings.

DETAILED DESCRIPTION

Figure 1:
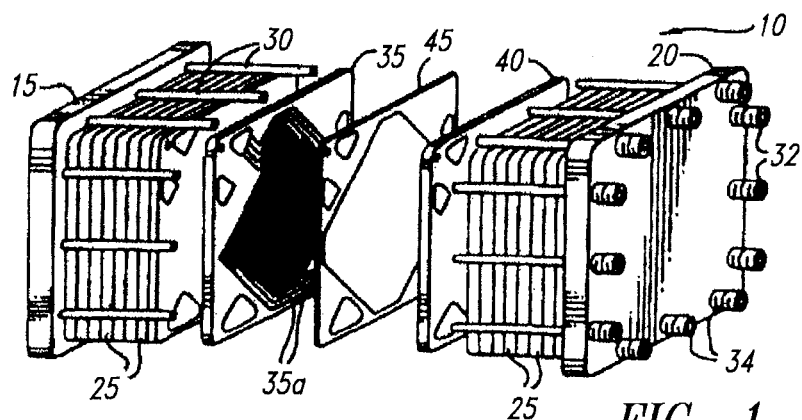
FIG. 1 is a partially exploded perspective view of a prior art fuel cell stack.

FIG. 1 illustrates a prior art fuel cell stack assembly 10, including a pair of end plates 15, 20 and a plurality of fuel cells 25 interposed therebetween. Tie rods 30 extend between end plates 15 and 20 to retain and secure fuel cell stack assembly 10 in its assembled state with fastening nuts 32. Springs 34 on the tie rods 30 interposed between the fastening nuts 32 and the end plate 20 apply resilient compressive force to the stack of fuel cells 25 in the longitudinal direction. Reactant and coolant fluid streams are supplied to and exhausted from internal manifolds and passages in the fuel cell stack assembly 10 via inlet and outlet ports (not shown) in end plate 15. Each fuel cell 25 includes an anode flow field plate 35, a cathode flow field plate 40, and an MEA 45. End plate 35 has a plurality of fluid flow passages 35a formed in its major surface facing MEA 45.

Figure 2:
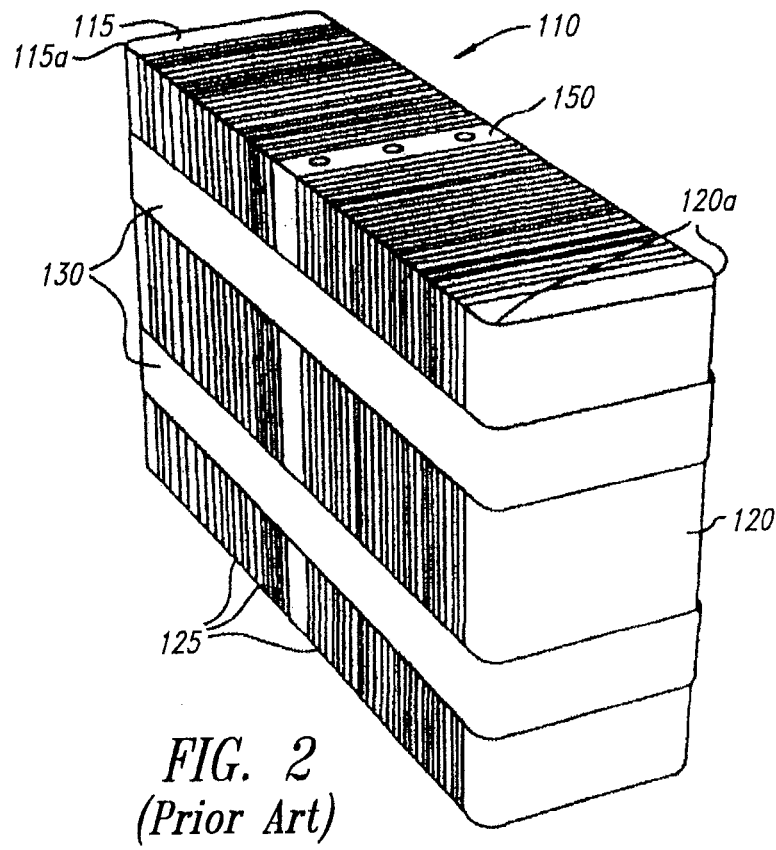
FIG. 2 is a perspective view of a prior art fuel cell stack.

FIG. 2 illustrates a prior art fuel cell stack assembly 110 including end plate assemblies 115 and 120 and a plurality of fuel cells 125 interposed between end plate assemblies 115, 120. Compression bands 130 extending tightly around the end plate assemblies 115, 120 and fuel cells 125 retain and secure fuel cell stack assembly 110 in its assembled state. End plate assemblies 115, 120 preferably have rounded edges 115a, 120a to reduce the stress on compression band 130.

Figure 3:
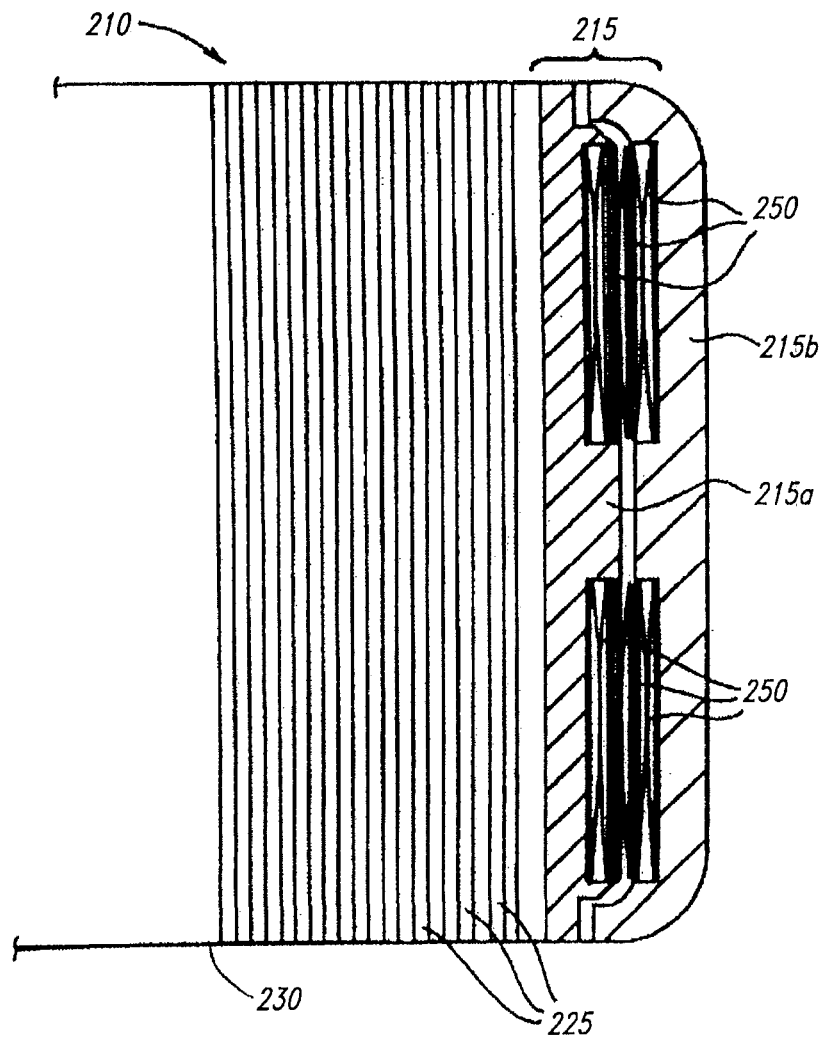
FIG. 3 is a side cross-sectional view of a prior art end plate assembly.

FIG. 3 is a side cross-sectional view of a portion of the fuel cell stack assembly 210 showing the prior art end plate assembly 215. End plate assembly 215 comprises a pair of plates 215a, 215b with stacks of disc springs 250 interposed therebetween. Compression band 230 and fuel cells 225 are shown. In this prior art end plate assembly 215, the endplates 215a and 215b engage disc springs 250 by the disc springs' outer diameters.

Figure 4A:
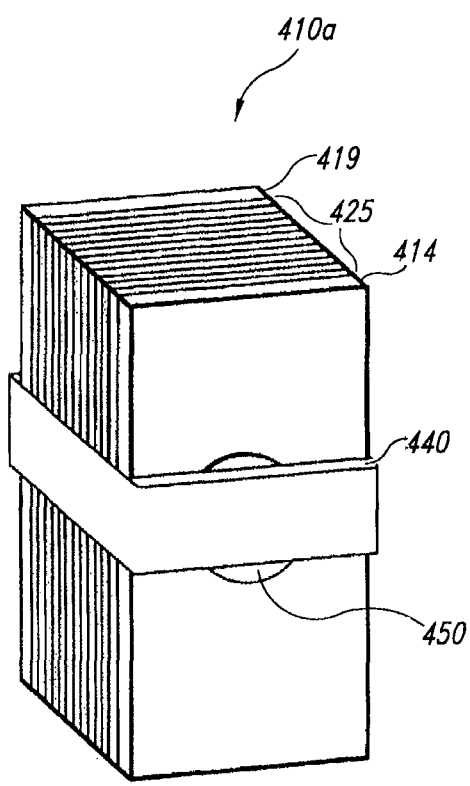
FIG. 4A is a perspective view of fuel cell stack according to one embodiment of the invention.

FIG. 4A illustrates a fuel cell stack assembly 410a according to one illustrated embodiment of the invention, in which a plurality of fuel cells 425 are disposed between end plates 414, 419. Spring bar 440 and disc spring 450 are interposed between compression band 430 and end plate 414. Compression band 430 extends tightly around spring bar 440 and fuel cells 425 and retains and secures fuel cell stack assembly 410a in its assembled state.

Figure 4B:
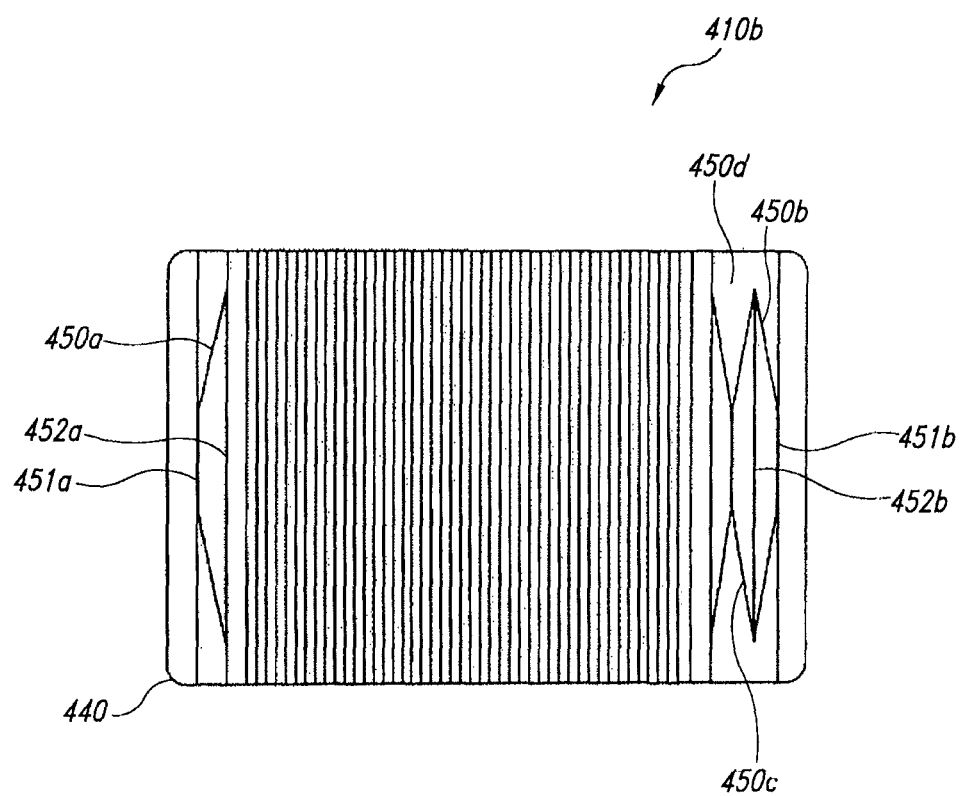
FIG. 4B is a side cross-sectional view of fuel cell stack according to another embodiment.

A person of ordinary skill in the art may choose to employ one or a plurality of disc springs. Where a single disc spring 450 is employed, it is arranged such that spring bar 440 loads the disc spring 450 at its inner diameter while the outer diameter contacts end plate 414. A plurality of disc springs may be employed to achieve a desired combined spring constant or spring travel. Where a plurality of disc springs is employed in the form of a spring stack, the disc springs may be arranged such that the outermost disc spring in the spring stack is loaded by the spring bar 440 by the outermost disc spring's inner diameter. The innermost disc spring in the spring stack may contact the end plate 414 by the outer diameter of the innermost disc spring to reduce load concentration on end plate 414; that is, such an arrangement increases the distribution of the compressive load across end plate 414. For example, FIG. 4B shows a cross section of fuel cell stack assembly 410b where a single disc spring 450a is employed at one end whereas three disc springs 450b-450d are employed at the opposite end.

Figure 5:
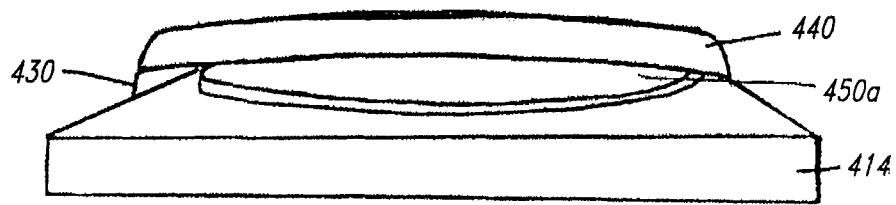
FIG. 5 is a partial perspective view of fuel cell stack according to one embodiment.

By loading disc spring 450a, 450b by spring bar 440 at the inner diameter 451a, 451b of the disc spring 450, the spring bar 440 is not required to have a width sufficient to span the outer diameter 452a, 452b of the disc spring 450a, 450b. That is, spring bar 440 may be made narrower than the outer diameter 452a, 452b of the disc spring 450a, 450b. By comprising less width and therefore, less material, spring bar 440 may be made resiliency flexible to further provide biasing properties to the assembly, improving sealing and electrical contact between the individual fuel cells 425. Furthermore, the lightweight and compact structure reduces the overall weight and volume of the fuel cell stack assembly increasing efficiency, cost and power density. For example, FIG. 5 shows end plate 414, spring bar 440, disc spring 450a and compression band 430 where spring bar 440 is deflected under the compressive load.

Spring bar 440 may be made of any suitable material including aluminum, steel, plastics and composite fiber based material such as Kevlar®. Where it is desirable for spring bar 440 to be resilient to deflection, as described above, spring bar 440 may similarly be made of aluminum, steel, plastics and composite fiber based material such as Kevlar®. A person of ordinary skill in the art may select an appropriate material for the spring bar 440. Spring bar 440 may be made by any suitable method known in the art including, for example, casting, machining and injection molding.

Figure 6:
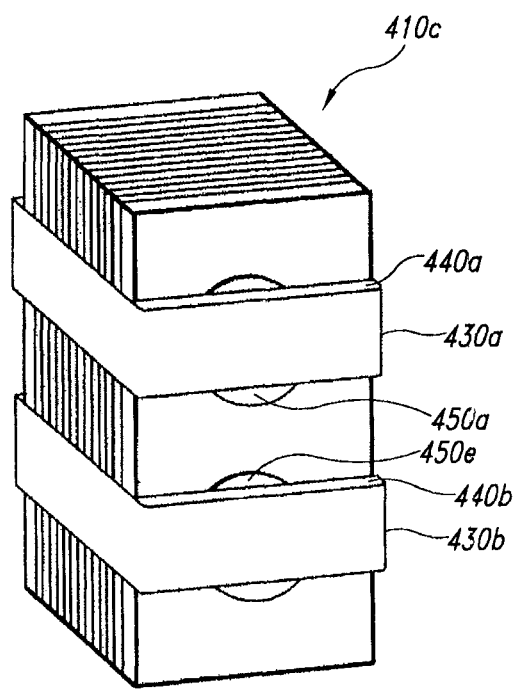
FIG. 6 is a perspective view of fuel cell stack according to one embodiment.

The fuel cell stack assembly may be configured with one or a plurality of compression bands circumscribing the fuel cell stack. In either case, disc springs and corresponding spring bars may be employed at one end or both ends of the fuel cell stack assembly. A person of ordinary skill in the art may readily choose the appropriate number of compression bands, disc springs and spring bars for a particular application. For example, FIG. 6 illustrates another embodiment of fuel cell stack assembly 410c where a plurality of compression bands 430a, 430b, spring bars 440a, 440b and disc springs 450a, 450e are employed.

Figure 7:
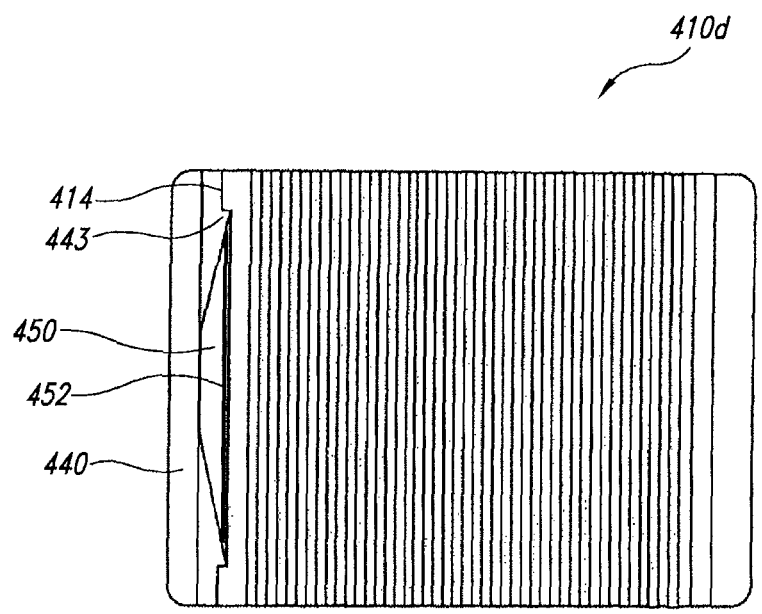
FIG. 7 is a side cross-sectional view of fuel cell stack according to another embodiment of the invention.

FIG. 7 illustrates an embodiment of fuel cell stack assembly 410d where disc spring 450 and spring bar 440 are employed on only one end of the fuel cell stack assembly 410d.

Figure 8A:
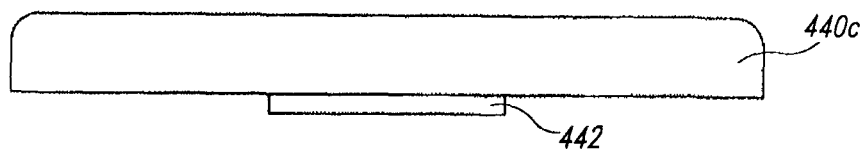
FIG. 8A is a side cross-sectional view of spring bar according to another embodiment.
Figure 8B:
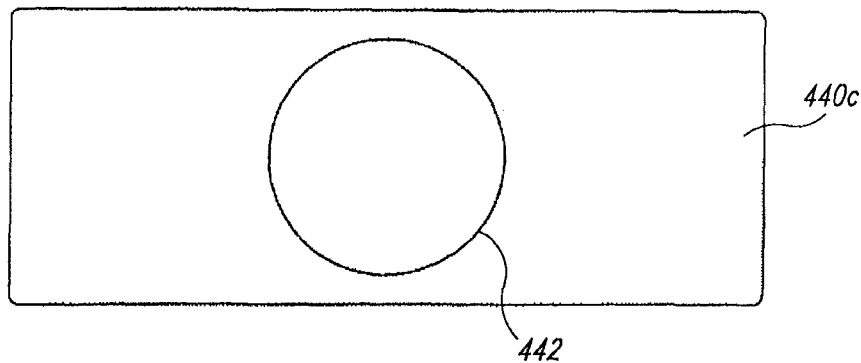
FIG. 8B is a bottom view of spring bar according to one embodiment.
Figure 8C:
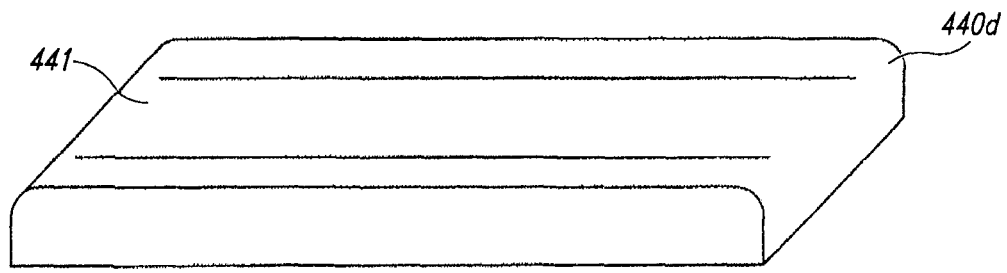
FIG. 8C is a perspective view of spring bar according to one embodiment.

Spring bar 440 may further be adapted to engage disc spring 450 at the inner diameter. FIG. 8A illustrates an embodiment of a spring bar 440c adapted to engage disc spring (not shown) by lip 442. Lip 442, for example, may be circular, as shown in FIG. 8B, or may be wavy, notched, broken, or a sector subtending a solid angle. Spring bar 440 may further be adapted to receive compression band. FIG. 8C shows a spring bar 440d with recess 441. Endplate 414 may similarly be adapted to engage a disc spring 450. For example, FIG. 7 illustrates an embodiment where endplate 414 is adapted to engage the outer diameter 452 of disc spring 450 by the recess portion of the endplate 414. Such adaptations for engagement or reception may provide ease of assembly and may better transfer compressive force to and from disc spring 450 from spring bar 440 and end plate 414.

A person of ordinary skill in the art may readily choose suitable materials for compressing the fuel cell stack, such as, for example, a band formed from rolled stainless steel (for example, 301 grade, 0.025 inch thickness, 2.5 inch width, tensile strength 26,000 psi) strapping, which is pre-welded to the desired length (circumference). When the compression component is fitted on the stack preferably the welded joint is located on one of the end plate assemblies. Where the compression component is made of an electrically conductive or semi conductive material, strips of electrically insulating material (not shown) may be interposed between compression component and the edges of the fuel cells.

The compression component may be applied to the stack in various ways, including, but not limited to those described below. Factors in determining the preferred fitting method include the nature of the compression component, the nature of any resilient members incorporated in the stack and the design of the stack including that of the end plate and spring bar. For example, if the compression component is formed as a continuous structure (or if it is preferable to join the ends of it prior to fitting it around the stack), the stack may be slightly 'over-compressed' in a fixture, one or more compression means slipped around the stack, and the stack released from the fixture. If the compression component is sufficiently stretchable and resilient it may be stretched in order to fit it around the stack. The ends of the compression component may be joined after it is wrapped around the stack, in which case, to ensure a tight fit, it may be again desirable to over-compress the stack in a fixture until one or more bands are fitted. If the length of compression component is adjustable, it may be fitted and subsequently tightened.

The longitudinal dimension of the stack can vary, even for a fixed stack design, due to slight differences in the thicknesses of stack components. Also, during use the longitudinal dimension of the stack tends to change. In some cases, for example if the length of compression band is not readily adjustable, it may be desirable to use spacer layers to increase the stack length, for example, during initial stack assembly and/or after prolonged use. This approach can be used to ensure that the desired compressive force is applied to the stack, without the need to prepare and inventory compression bands of many slightly differing lengths.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. To the extent that they are not inconsistent with the specific teachings and definitions herein, all of the above U.S. patents, U.S. patent application publications, U.S. patent applications, foreign patents, foreign patent applications and non-patent publications referred to in this specification and/or listed in the Application Data Sheet including but not limited to U.S. application Ser. No. 11/562,886, filed Nov. 22, 2006 are incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A fuel cell stack assembly comprising:
a first end plate;
a second end plate;

a plurality of fuel cells interposed between the first and the second end plates in a first direction;

a spring bar;

a disc spring having, in a plane perpendicular to the first direction, an inner and an outer diameter, interposed between the first end plate and the spring bar, wherein the spring bar contacts and loads the disc spring at the inner diameter of the disc spring; and a compression band circumscribing the first endplate, the second end plate, the plurality of fuel cells and the spring bar;

wherein the compression band biases the spring bar toward the first end plate and second end plate, thereby applying compressive force upon the plurality of fuel cells, and wherein a width of the spring bar in the plane perpendicular to the first direction is less than the outer diameter of the disc spring so that the width of the spring bar does not completely overlap with the outer diameter of the disc spring.

2. The fuel cell stack assembly of claim 1 wherein the spring bar is comprised of a resilient material.

3. The fuel cell stack assembly of claim 2 wherein the resilient material includes at least one of aluminum, steel, plastic, and composite fiber based material.

4. The fuel cell stack assembly of claim 3 wherein the resilient material is aluminum.

5. The fuel cell stack assembly of claim 1 wherein the spring bar is adapted to physically engage the disc spring at the inner diameter of the disc spring.

6. The fuel cell stack assembly of claim 1 wherein the spring bar is adapted to receive the compression band.

7. The fuel cell stack assembly of claim 1 wherein the first end plate is adapted to receive the disc spring.

8. A fuel cell stack assembly comprising:

a first end plate;

a second end plate;

a plurality of fuel cells interposed between the first and the second end plates in a first direction;

a first spring bar;

a second spring bar;

a first disc spring having, in a plane perpendicular to the first direction, an inner and an outer diameter, interposed between the first end plate and the first spring bar, wherein the first spring bar contacts and loads the first disc spring at the inner diameter of the first spring;

a second disc spring having, in the plane perpendicular to the first direction, an inner and an outer diameter, interposed between the second end plate and the second spring bar, wherein the second spring bar contacts and loads the second disc spring at the inner diameter of the second spring; and a compression band circumscribing the first spring bar, the second spring bar, the plurality of fuel cells, the first end plate and the second end plate;

wherein the compression band biases the first spring bar toward the second spring bar, thereby applying compressive force upon the plurality of fuel cells, and wherein a width of the first spring bar in the plane perpendicular to the first direction is less than the outer diameter of the first disc spring so that the width of the first spring bar does not completely overlap with the outer diameter of the first disc spring, and a width of the second spring bar in the plane perpendicular to the first direction is less than the outer diameter of the second disc spring so that the width of the second spring bar does not completely overlap with the outer diameter of the second disc spring.

9. The fuel cell stack assembly of claim 8, wherein at least one of the first and second spring bars is comprised of a resilient material.

10. The fuel cell stack assembly of claim 9 wherein the resilient material is at least one of aluminum, steel, plastic, and composite fiber based material.

11. The fuel cell stack assembly of claim 9 wherein the resilient material is aluminum.

12. The fuel cell stack assembly of claim 8 wherein at least one of the first and the second spring bars is adapted to engage a corresponding one of the first or the second disc springs at the inner diameter of the first or the second disc spring.

13. The fuel cell stack assembly of claim 8 wherein at least one of the first and the second end plates is adapted to receive the compression band.

14. The fuel cell stack assembly of claim 8 wherein at least one of the first and the second end plates is adapted to receive a respective one of the disc springs.

15. A fuel cell stack assembly comprising:

a first end plate;

a second end plate;

a plurality of fuel cells interposed between the first and the second end plates in a first direction;

a spring bar;

a disc spring having, in a plane perpendicular to the first direction, an inner and an outer diameter, interposed between the first end plate and the spring bar, wherein the spring bar contacts and loads the disc spring at the inner diameter; and a compression component that biases the spring bar toward the first end plate and second end plate, thereby applying compressive force upon the plurality of fuel cells, and wherein a width of the spring bar in the plane perpendicular to the first direction is less than the outer diameter of the disc spring so that the width of the spring bar does not completely overlap with the outer diameter of the disc spring.

* * * * *